United States Patent Office 3,515,520
Patented June 2, 1970

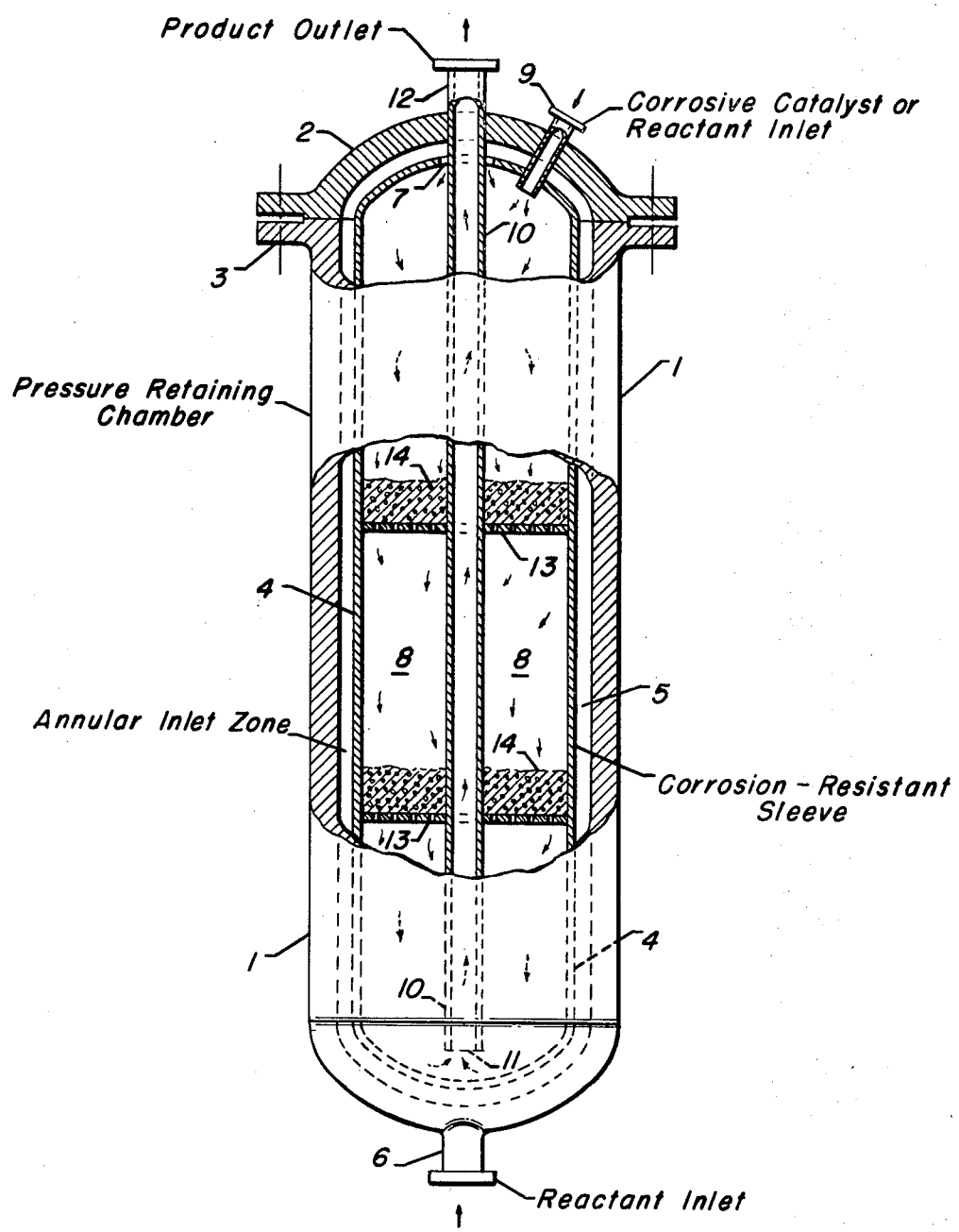

3,515,520
REACTOR WITH INTERNAL PROTECTIVE SLEEVE
FOR CORROSIVE SYSTEMS
George L. Hervert, Downers Grove, Ill., assignor to Universal Oil Products Company, Des Plaines, Ill., a corporation of Delaware
Filed Feb. 13, 1967, Ser. No. 615,663
Int. Cl. B01j 3/02, 9/04
U.S. Cl. 23—290                                         1 Claim

ABSTRACT OF THE DISCLOSURE

A reactor for accommodating corrosive materials wherein a corrosion resistant liner is suspended within an outer reaction chamber and in non-contacting relationship therewith, the chamber having an inlet for non-corrosive gases at its lower end admitting such gases to the annular space between liner and chamber with a passageway at the top of the liner for admission of such gases, and an adjacent corrosive fluid inlet into the liner, with centrally disposed discharge means from said liner for exit of reaction products of the corrosive and non-corrosive gases.

---

The present invention is directed to an improved form of reactor utilizing an internal protective sleeve in a manner permitting the accommodation of corrosive systems. More specifically, there is provided a reactor which has an internal special sleeve or liner that is spaced from the inner wall of the reactor chamber in a manner which provides an annular reactant fluid inlet path which in turn will serve to preclude any flow to the outer wall of the reactor of a corrosive or reactive stream that is being introduced into the central reaction zone of the unit.

Various constructions and arrangements have been used in connection with internally lined or clad reactor vessels in order to resist a corrosive stream or particles or to prevent the passage of hydrogen and thus preclude hydrogen blistering and embrittlement on a carbon steel outer chamber. The internal placement of a liner means within a reactor chamber is generally expensive and at the same time it is difficult to obtain a good lining construction which does not buckle or have pin-point type leakage problems, particularly in connection with high pressure systems. In some instances there have been constructions where a non-metallic type of insulating material has been placed between an internal liner and an external carbon steel reactor chamber in order that the latter may operate at a reduced temperature and better withstand hydogen penetration. However, in most prior types of construction there is the difficulty of fully encasing a corrosive phase or a highly reactive penerating phase from passing through pin-point openings and small cracks of any liner or clad construction as well as through any intermediate insulation materials.

In the present invention, it may be considered a principal object thereof to in effect provide the equivalent to a lined or clad reactor without actually having the lining means physically welded or attached to the inside wall of the reactor chamber. In other words, the liner means of the present construction will be spaced a short distance inwardly from the inside wall of the reactor chamber in the manner to provide a pressurized fluid inlet passageway for a reactant stream which will not be harmful to the external chamber wall itself.

It is a further object of the present invention to provide for an actual controlled positioning of the internal corrosive resistant protective sleeve or liner means such that there is an annular space which will insure a greater pressure therein than will exist within the exterior of the reactor itself so as to prevent any leakage of an undesirable reactive or corrosive phase into contact with the outer chamber wall.

The present reactor design is particularly suitable for use with extreme reactive or corrosive materials, such as may be encountered in catalytic operations using hydrogen bromide, hydrogen chloride, and the like, or a highly penetrating material such as hydrogen. The design may also be utilized with either high or low pressure systems; however, in each case the arrangement of reactor inlets and outlets shall be such that at least one non-corrosive reactant phase is introduced into an annular passageway adjacent the outer chamber wall and surrounding the protective corrosive resistant sleeve section so that all corrosive catalysts or highly reactant phases will be contained within the protected zone.

It is not intended to limit the actual configuration or the specific material utilized for the protective sleeve section which serves as an inner wall or liner for the principal reaction zone, inasmuch as such sleeve or liner may comprise a non-corrosive metal or metal alloy, including such materials as the various stainless steels, silver and other noble metals, a base metal or other rigid base material which in turn is coated with a suitable corrosive resistant glass or ceramic. Generally, the protective sleeve construction can be relatively thin inasmuch as it need only withstand a small amount of pressure differential such as will exist between the outer annular passageway for a non-corrosive type reactant phase and the pressure maintained within the principal central reaction zone. In any case, it is not intended to limit the present invention to any one type of metal or to one type of coating material for the spaced internal sleeve of the reactor chamber.

In a broad aspect, the present invention may be considered to provide an improved lined reactor for accommodating harmfully reactive material in a manner which comprises, an external pressure retaining chamber, an internal corrosive resistant liner spaced inwardly from said chamber and providing an annular flow space therebetween, a non-corrosive reactant fluid inlet to said annular space at one end portion thereof, a fluid passageway through said liner to the interior thereof at a zone substantially opposite said fluid inlet to the annular space, whereby a non-corrosive fluid is continuously maintained in said annular space, a corrosive fluid inlet means to the interior of said liner to admix with the non-corrosive fluid entering through said passageway thereof, and a reaction product outlets means extending outwardly from the interior of said reactor to the exterior of said chamber.

Generally, the reactor will be constructed or arranged to have a vertical positioning such that one or more non-corrosive reactant materials will enter at an upper or lower end and pass the full length of the reactor chamber around the internal protective sleeve or liner to an opposing end where such stream enters the interior reaction zone of the unit and passes into admixture with the corrosive phase that is being introduced directly into the internal portion of the reactor unit. Thus, there is a reversing flow for at least one of the reactant phases being introduced into the reaction zone and such phase will have sufficient pressure entering the annular space around the internal sleeve such that there will be a blockage of any outward radial flow of a harmful reactive or catalytic material being accommodated within the interior of the reactor.

Also, in order that there may be adequate time for effecting mixing and completion of reactions within the internal zone there will generally be a provision for withdrawing the product stream from a section or zone which is remote from the reactive phase inlet into the interior of the lined zone.

The present improved design does not preclude the use of various types of packing which may be catalytic or inert within the interior reaction zone of the unit; however, the use of such internal baffling or packing does not comprise a particular feature of the present invention.

Reference to the accompanying drawing and the following description thereof will serve to illustrate one embodiment of the invention as well as point out further advantageous features in connection therewith.

Diagrammatically, there is indicated the use of an external pressure retaining chamber 1 having a removable end portion or cover section 2 by virtue of suitable flange connecting means 3 capable of operating under the design pressure conditions of the reactor. In the present embodiment, there is also indicated an internal corrosive resistant sleeve section 4 which is suspended, or suitably supported by spacer means not shown, within the confines of chamber 1 and end section 2 such that there is an annular space 5 entirely surrounding the exterior of such sleeve 4. Passing through the end of chamber 1 and communicating with the internal annular spacing 5 is a reactant fluid inlet means 6 which will permit a non-corrosive reactant phase to entirely encompass the sleeve 4 by longitudinal passage in zone 5 to the opposing end of the reactor where sleeve 4 is provided with an open passageway 7 into the interior zone 8.

In accordance with the present invention, at least one additional fluid inlet means is provided into the interior zone of the reactor, such as by fluid inlet nozzle means 9 shown in a manner to discharge a reactive or corrosive phase adjacent the fluid passageway 7 at the end of the liner or sleeve section 4. Thus, the reactant streams or reactant and catalyst streams, can be introduced into admixture with one another so as to continue in a mixed phase down through the length of the reaction zone 8 prior to entering outlet conduit 10. In the present embodiment, the latter is shown as a fully longitudinal and axially positioned open-ended conduit with inlet end 11 such that there is a reversing flow for the product stream and a heat exchange relationship with the down flow of the mixing reactants in zone 8. The outlet conduit 10 in turn extends outwardly through the reactor to discharge by way of a product outlet nozzle 12 at the end of the reactor chamber opposing the non-corrosive reactant inlet 6.

In a modified construction, where it is not desired to have the extended outlet conduit 10 in the heat exchange relationship for the full reversing length of the inner reactor zone 8, then suitable outlet means may be provided from the latter at the end zone of the reactor opposing fluid passageway means 7 and fluid inlet means 9.

In order that the reactor chamber operate in the preferred and satisfactory manner, the cross-sectional area of the annular zone 5 shall be substantially less than that of the internal reaction zone 8 whereby a greater pressure may be readily attained within the annular zone 5 for the reactant stream entering by way of inlet 6. Thus, there will be a small pressure differential across the corrosive resistant sleeve 4 to a slightly lower pressure being maintained internally therein and which will preclude leakage on any of the corrosive phase into the annular inlet compartment or zone 5 through any pin-hole leaks or ruptures which may be present in the liner section itself.

As noted briefly hereinbefore, a suitable packing material may be provided within the reaction zone 8 and, in the embodiment of the drawing, there is indicated the use of transverse perforate plates 13 adapted to hold suitable packing material 14 which will assist in effecting the mixing between the non-corrosive reactant and catalyst or reactive phases present in the particular reactor system. The material of beds 14 may be catalytic or non-catalytic, as may be required for any particular reaction. It may also be noted that while the present drawing indicates the reactor to be positioned in a vertical arrangement, it is quite possible that the reactor may be placed in a substantially horizontal arrangement with lateral flows within the annular inlet zone as well as within the internal reaction space 8 and within the outlet conduit 10. Suitable baffling and/or packing materials may also be arranged within a horizontally positioned chamber so that there is enhancement of mixing of the reactant streams in the lateral flow through the principal internal reaction zone.

I claim as my invention:

1. A lined reactor for accommodating harmfully reactive materials which comprises in combination, a vertically disposed external pressure retaining reactor chamber, an internal corrosive resistant liner spaced inwardly of and suspended from said chamber and providing an annular flow space therebetween, the entire exterior surface of said linear being in non-contacting relationship with respect to the internal wall of said chamber, a non-corrosive reactant fluid inlet to said annular space through the lower end portion of said chamber, a non-corrosive fluid passageway through said liner to the interior thereof at the upper end thereof and at a position substantially opposite said non-corrosive fluid inlet, whereby a non-corrosive fluid is maintained in said annular space, a corrosive fluid inlet means adjacent said fluid passageway to the interior of said liner and at the upper end thereof to admix with the non-corrosive fluid, and a centrally disposed reaction product outlet means extending from the interior of said reactor through said non-corrosive fluid passageway to the exterior of said chamber, said reaction product outlet means having connected thereto an open-ended fluid conduit positioned within the interior of said reactor chamber and the open end of said conduit being positioned substantially opposite the inlet means to said internal liner, said open-ended conduit extending axially through said reactor and discharging at the end portion of said reactor which has the fluid passageway through the liner whereby there is heat exchange flow with the fluids in the interior of the liner.

References Cited

UNITED STATES PATENTS

| 1,735,107 | 11/1929 | Claude et al. | 23—289 X |
| 1,884,880 | 10/1932 | Saunders | 23—252 X |
| 2,212,835 | 8/1940 | Keane et al. | 23—290 X |
| 2,768,200 | 10/1956 | Busby | 23—290 X |
| 3,041,152 | 6/1962 | Christensen | 23—290 |
| 3,172,832 | 3/1965 | Dreyer et al. | 23—288 X |

JOSEPH SCOVRONEK, Primary Examiner

U.S. Cl. X.R.

23—252, 289